UNITED STATES PATENT OFFICE.

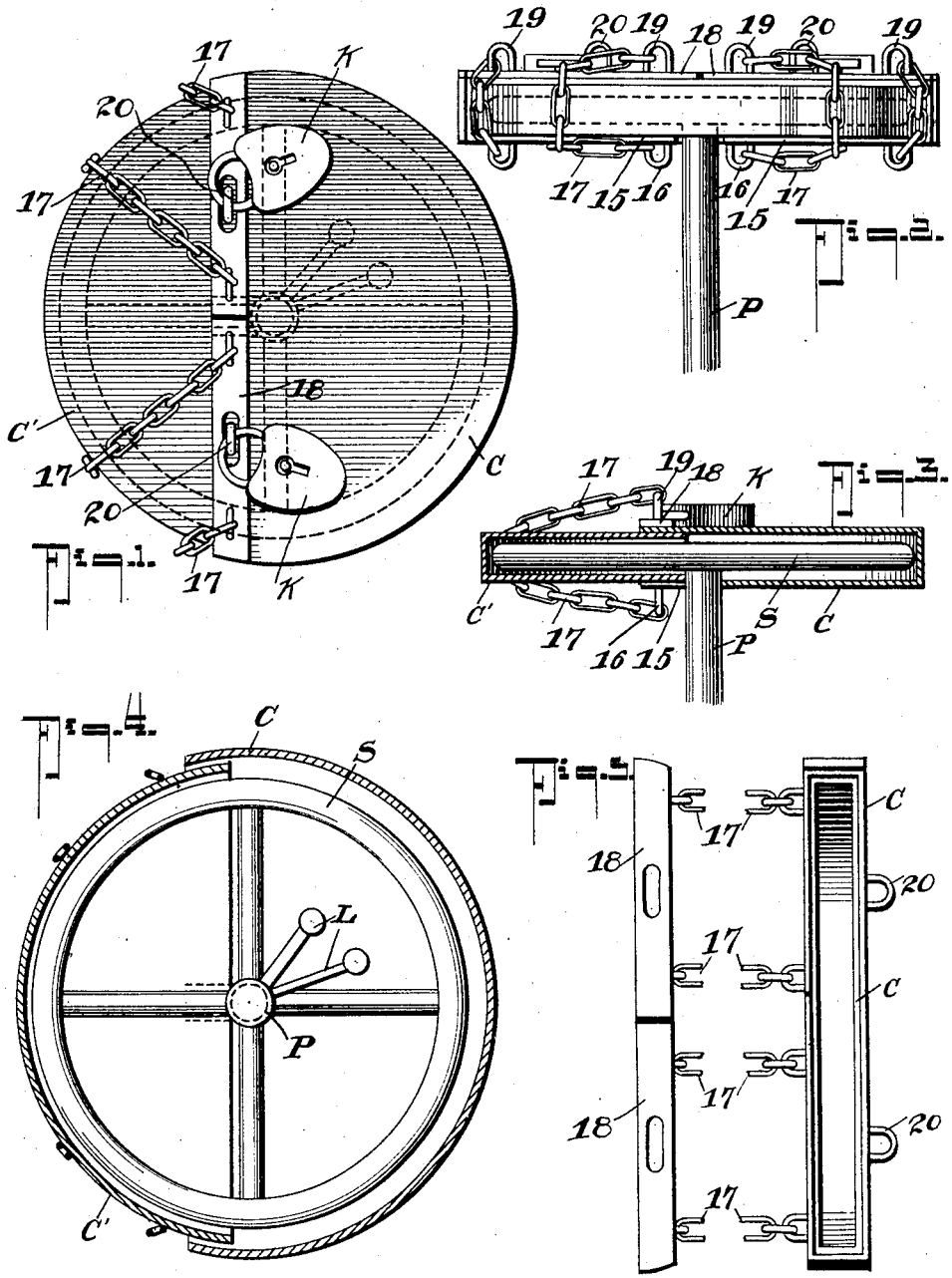

ELBERT REED TILDEN, OF WEST CONCORD, MINNESOTA.

THEFT-PREVENTING ATTACHMENT FOR STEERING-WHEELS.

1,395,532.   Specification of Letters Patent.   Patented Nov. 1, 1921.

Application filed May 4, 1920. Serial No. 378,739.

*To all whom it may concern:*

Be it known that I, ELBERT REED TILDEN, a citizen of the United States, and a resident of West Concord, in the county of Dodge and State of Minnesota, have invented certain new and useful Improvements in Theft-Preventing Attachments for Steering-Wheels, of which the following is a specification.

My invention relates to motor vehicles and particularly to an attachment for the steering wheel thereof to prevent the manipulation of the steering wheel and the throttle levers whereby, the theft of the vehicle is prevented.

I will describe one form of attachment embodying my invention and will then point out the novel features thereof in claim.

In the accompanying drawings:

Figure 1 is a view showing in dash lines a steering wheel having applied thereto one form of attachment embodying my invention.

Fig. 2 is a view similar to Fig. 1 showing the attachment in side elevation.

Fig. 3 is a vertical sectional view of the attachment in applied position upon a steering wheel.

Fig. 4 is a horizontal sectional view of the attachment in applied position upon a steering wheel.

Fig. 5 is a view showing the attachment removed from the steering wheel and in partially folded position.

Similar reference characters refer to similar parts in each of the several views.

Referring specifically to the drawings and particularly to Fig. 4, S designates a conventional form of steering wheel mounted upon a steering post P, and L designates generally the usual throttle levers.

The attachment forming the subject matter of my invention comprises a casing designated generally at C, which is formed of suitable metal and is of such a contour as to completely house a steering wheel. As illustrated to advantage in Fig. 4, the casing C is formed of two semi-circular sections; the larger section $c$ being adapted to telescopically receive the smaller section $c'$ when the casing is in applied position upon the steering wheel.

For confining the smaller section in applied position upon a steering wheel and for locking the two sections together against displacement from the steering wheel, I provide a locking means comprising plates 15 secured to the under side of the section $c$ having staples or eyes 16 secured thereto. Connected to each of the staples 16 are chains or other suitable flexible members 17 which carry at their free ends plates 18 secured to the chains by staples or eyes 19. As shown in Figs. 1 and 5, I provide four chains 17 which are arranged in pairs, the chains of one pair being secured to one of the plates 15 and to one of the plates 18. The chains of each pair differ in length so as to embrace the section $c'$ when in applied position upon the steering wheel and to allow of the disposition of the plate 18 upon the upper side of the section $c$ at a point opposite to the plates 15. Secured to and upstanding from the section $c$ at the point just mentioned, are hasps 20 which as illustrated to advantage in Fig. 1 are adapted to extend through suitable openings formed in the plates 18. The plates 18 are secured in position upon the section $c$ by a conventional form of padlocks K which engage the hasps 20 in the manner shown in Fig. 1 thereby securing the plates and their chains in applied position to the section $c'$.

In the application of the attachment to a steering wheel, the sections of the casing C are arranged to embrace the wheel in the manner shown in Fig. 4 wherein it will be seen that the smaller section $c'$ has its confronting end inserted within the larger section $c$. The chains 17 are now moved to embrace the section $c'$ so that the plates 18 rest upon the section $c$ and receive the hasps 20. The padlocks are now applied thus securing the plates 18 against displacement and causing the chains to firmly embrace the section $c'$ so that displacement of the latter with respect to the large section $c$ is prevented.

By this arrangement it will be seen that the casing C completely houses the steering wheel S and in so doing prevents actuation of the steering wheel and the throttle levers, it being understood that the casing C loosely embraces the steering wheel so that an operator cannot effect a rotation of the steering wheel through the medium of the casing.

When the attachment is not in use it may be compositely folded by placing small section $c'$ within the large section $c$ in the manner shown in Fig. 5, and the plates 18 and the chains 17 can then be placed within the small section $c'$.

Although I have herein shown and described only one form of attachment embodying my invention, it is to be understood that various changes and modifications may be made herein without departing from the spirit of the invention and the spirit and scope of the appended claim.

What I claim is:

An attachment for steering wheels comprising, a casing formed of sections, and means carried by one of the sections for locking the sections against relative movement outwardly comprising, flexible members arranged to embrace the other section, plates secured to the flexible members, and staples secured to the first section and adapted to extend through said plate for holding the flexible members in embracing position with respect to the other section.

ELBERT REED TILDEN.